US 6,709,074 B2

(12) United States Patent
Wandel

(10) Patent No.: US 6,709,074 B2
(45) Date of Patent: Mar. 23, 2004

(54) METHOD AND APPARATUS FOR AN ANTI-SPIN REGULATION (ASR) FOR A VEHICLE

(75) Inventor: Helmut Wandel, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/745,962

(22) Filed: Dec. 22, 2000

(65) Prior Publication Data

US 2001/0014844 A1 Aug. 16, 2001

(30) Foreign Application Priority Data

Dec. 30, 1999 (EP) .......................................... 99126206

(51) Int. Cl.[7] ................................................. B60T 8/24
(52) U.S. Cl. ..................... 303/139; 303/169; 303/113.2
(58) Field of Search .......................... 303/113.1, 113.2, 303/139, 149, 169, 116.1, 119.1

(56) References Cited

U.S. PATENT DOCUMENTS

| | | | | |
|---|---|---|---|---|
| 4,967,866 A | * | 11/1990 | Maehara | 303/139 |
| 4,976,329 A | * | 12/1990 | Ise | 303/139 |
| 5,102,203 A | * | 4/1992 | Tierney | 303/162 |
| 5,273,350 A | * | 12/1993 | Yagi et al. | 303/154 |
| 5,688,029 A | * | 11/1997 | Bach et al. | 303/139 |

FOREIGN PATENT DOCUMENTS

DE 198 37 524.7 2/2000

* cited by examiner

Primary Examiner—Jack Lavinder
Assistant Examiner—Tom Williams
(74) Attorney, Agent, or Firm—Kenyon & Kenyon

(57) ABSTRACT

A method and an apparatus for an anti-spin regulation (ASR) for a vehicle are described. The method is characterized in that a slipping driven wheel (20, 30) is braked by braking means (220, 230). A further driven wheel (20, 30) is monitored by monitoring means, (25, 35). The further driven wheel (20, 30) is braked by braking means (220, 230) in case a slipping trend is determined by determination means (90) for said further driven wheel (20, 30). The apparatus is in particular eligible for use with the inventive method and is characterized in that braking means (220, 230) are implemented for braking a slipping driven wheel (20, 30). Monitoring means (25, 35) are implemented for monitoring a further driven wheel (20, 30). Braking means (220, 230) are implemented for braking the further driven wheel (20, 30) in case a slipping trend is determined by further implemented determination means (90) for said further driven wheel (20, 30).

20 Claims, 3 Drawing Sheets

METHOD AND APPARATUS FOR AN ANTI-SPIN REGULATION (ASR) FOR A VEHICLE

The present invention concerns a method and an apparatus for an anti-spin regulation (ASR) for a vehicle.

Generally, anti-spin regulation (ASR) is based on the detection of wheel speeds while a car is driving or starts driving. When the velocity of one or more driven wheels exceeds the speed of the car, an anti-spin regulation procedure is executed. For this purpose, the slipping wheels are braked by means of a braking system. Additionally or alternatively, the engine speed is reduced. When the slipping of the wheel(s) is reduced, the braking procedure is terminated and/or the engine speed is increased again.

Anti-spin regulation (ASR) principally increases the traction potential of a vehicle. However, in particular in case of anti-spin regulation systems which use brake systems, situations occur, in which during an anti-slip regulation for a slipping driven wheel a further driven wheel tends to slip. This occurs even in case the further driven wheel would principally have a sufficient traction, because an enlarged part of the tractive force is transmitted to this wheel. For example, corresponding situations occur in case of large differences concerning the coefficients of friction for the individual driven wheels.

A way of remedy for the above described situation is disclosed in German Patent Application No. DE 198 37 524.7, filed Sep. 19, 1999. Therein is described a method and apparatus for an anti-slip regulation, or traction control, where one wheel is controlled by building up and reducing braking force in the case of incipient free spinning, braking force being reduced at the controlled wheel when incipient free spinning is to be expected at the uncontrolled wheel.

According hereto, the braking force on the slipping wheel is reduced when a further driven wheel tends to slip.

It is the object of the present invention, to provide an improved method and apparatus for an anti-spin regulation (ASR) for a vehicle.

The object of the present invention is achieved by providing a method for an anti-spin regulation (ASR) for a vehicle, characterized in that a slipping driven wheel is braked by braking means. A further driven wheel is monitored by monitoring means. The further driven wheel is braked by braking means in case a slipping trend is determined by determination means from the monitoring results for said further driven wheel.

The object of the present invention is further achieved by providing an apparatus for an anti-spin regulation (ASR) for a vehicle, in particular eligible for use with the inventive method, characterized in that braking means are implemented for braking a slipping driven wheel. (Monitoring means are implemented for monitoring a further driven wheel.) Braking means are implemented for braking the further driven wheel in case a slipping trend is determined by determination means from the monitoring results for said further driven wheel.

By way of example, here as in the following, any slip $\lambda$ is described as:

$$\lambda = \frac{v_w - v_v}{v_v}$$

wherein $v_w$ is the velocity of the slipping wheel and $v_v$ is the velocity of the vehicle (or any other suitable reference velocity). Hence, the slip $\lambda$ is described as the relative difference of the velocity of the slipping wheel $v_w$ and the velocity of the vehicle $v_v$. Moreover, since small slips $\lambda$ may be neglected within an anti-spin regulation, only slips $\lambda$ of a minimum extent are considered as wheel slips. On the other hand, smaller slips may be considered as slipping trends.

As according to the invention, an anti-spin regulation is provided, according to which slipping occurrences on non-braked, further driven wheels are reduced. Hence, the driving stability is increased. Moreover, the necessity of reduction of the engine speed (which would occur in case two or more driven wheels are slipping) is reduced to a smaller number of cases. In addition hereto, the influence of the anti-spin regulation on the slipping wheel may be increased. On the other hand, in case the further driven wheel cannot be prevented from slipping, a corresponding anti-spin regulation is improved, since a suitable braking force is faster available.

Preferably, the braking force on the slipping driven wheel is reduced when the slipping trend is determined by the determination means for said further driven wheel.

This advantageously combines the invention with a particular suitable method which is known itself as according to the state of the art. Resulting thereof, the advantages of the invention are even intensified.

Within a preferred implementation of the inventive method the slipping trend is determined by the determination means for said further driven wheel by means of comparison of the velocity of the driven wheel to the velocity of the vehicle and comparison of the difference of both velocities (the slipping trend value) to a predefined slipping trend threshold.

This allows an easy implementation of the inventive method. Furthermore, it is possible, to perform the slipping trend detection with ordinary available system components and control means of a anti-slip regulation system.

Advantageously, the anti-spin regulation is executed, when a slipping threshold is exceeded by the difference of the velocity of the slipping wheel and the velocity of the vehicle. The slipping trend threshold is on the same scale below the slipping threshold.

By doing so, it is easy to ensure that by means of consideration of the slipping trend threshold slipping occurrences may be prevented.

The braking force on the further driven wheel may be built up in steps as long as the slipping trend threshold is exceeded, stability thereby being increased.

Preferably, the gradient for building up the braking force on the further driven wheel is modified in accordance with the achieved braking force. Excessive pressure build-up would signify loss of traction, since here split-friction road surface conditions (SH) are assumed.

Within a further preferred implementation of the invention, the braking force on the further driven wheel is reduced in steps when the slipping trend value is below the slipping trend threshold.

By doing so, on the one hand, it is ensured that the braking force is available for a sufficient duration of time. On the other hand, it is ensured, that the braking force is not applied to the further driven wheel for a too long time.

The invention will be explained below in more detail with reference to exemplary embodiments, referring to the figures in which.

Figure 1:
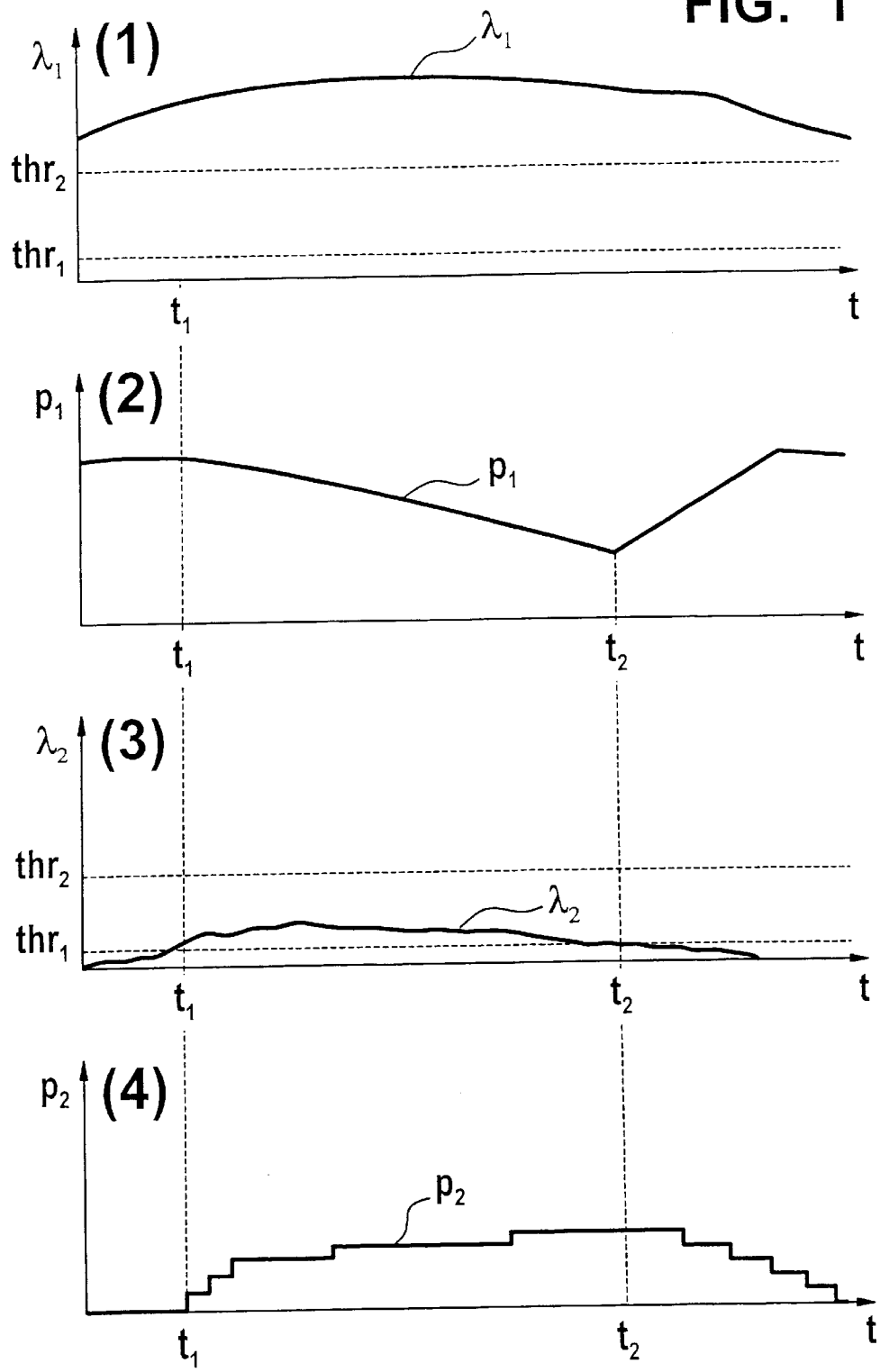
FIG. 1 shows a depiction of graphs illustrating an anti-spin regulation as according to the invention.
Figure 3:
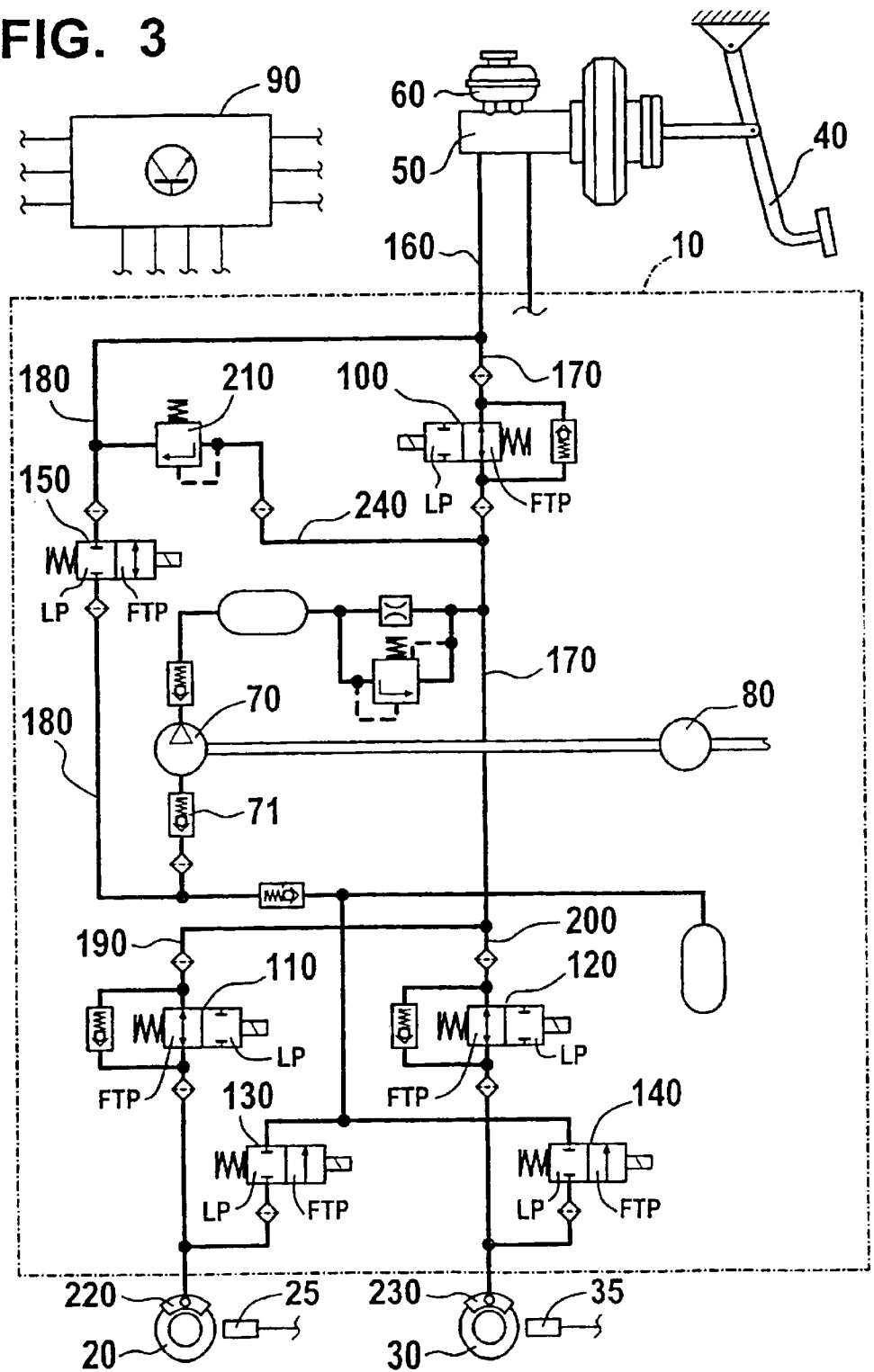
FIG. 3 shows a block diagram of an environment in which the invention is implemented.

In FIG. 1, by way of example, an anti-spin regulation which is executed by means of an hydraulic braking system (as depicted in FIG. 3 and explained below) is illustrated. However, it is to be understood, that the anti-spin regulation might be executed by any other braking system as well as additionally or alternatively by any engine control system without any effect on the invention itself.

FIG. 1 comprises four graphs (1), (2), (3) and (4). In each graph (1), (2), (3) and (4) quantities are depicted as functions of the time during the same time slot. Hence, the base axis of each graph (1), (2), (3) and (4) is a time axis t and the time axes t of the four graphs (1), (2), (3) and (4) are equal one to another.

Moreover, within the first graph (1), the remaining axis is a slip axis $\lambda_1$ and the slip $\lambda_1$ of a first slipping wheel of the car is depicted (the definition of the slip $\lambda_1$ is discussed below). Within the second graph (2) the remaining axis is a pressure axis $p_1$ and the pressure $p_1$ of a pressurized medium within a first branch of the hydraulic braking system is depicted. Then, within the third graph (3), the remaining axis is a slip axis $\lambda_2$ and the slip $\lambda_2$ of a further driven wheel of the car is depicted. Finally, within the fourth graph (4) the remaining axis is a pressure axis $p_2$ and the pressure $p_2$ of a pressurized medium within a second branch of the hydraulic braking system is depicted.

Within the example considered, the slip $\lambda_1$ of the slipping wheel as well as the slip $\lambda_2$ of the further driven wheel are described as:

$$\lambda = \frac{v_w - v_v}{v_v}$$

wherein $v_w$ is the velocity of the slipping wheel and $v_v$ is the velocity of the vehicle. Hence, the slip $\lambda$ is the relative difference of the velocity of the slipping wheel $v_w$ and the velocity of the vehicle $v_v$ (thereby, the velocity of the vehicle may be measured by means of any suitable method, such as measuring the velocity of the non-driven wheels only, averaging velocities of several wheels etc). However, any other suitable description of the slip $\lambda$ may be used with the invention (for example, the absolute instead of the relative velocity difference $\Delta v_{w,v}$, or any other suitable reference velocity instead of the velocity of the vehicle may be used).

In the example considered, the slip $\lambda_1$ of the slipping wheel exceeds a slipping threshold $thr_2$, as shown in graph (1). For simplicity, the slipping threshold $thr_2$ is assumed to be constant. However, the slipping threshold $thr_2$ might be any suitable function over the time without any effect on the invention. For example, in case the slip $\lambda_1$ is defined as the absolute instead of the relative velocity difference $\Delta v_{w,v}$, the slipping threshold $thr_2$ might depend on the velocity of the vehicle $v_v$ and therefore change over the time.

It is to be understood, that in principle any positive difference of the velocity of a driven wheel relative to the velocity of the vehicle means could be considered as wheel slip. However, small wheel slips are not taken into account by the exemplarily considered anti-spin regulation system. Hence, in the following only wheel slips which exceed the slipping threshold $thr_2$ are considered as wheel slips.

Since the slip $\lambda_1$ exceeds the slipping threshold $thr_2$ an anti-spin regulation is executed. During the anti-spin regulation, within the example considered, a first pressure $p_1$ is built up in an hydraulic braking system and therefore braking force is applied to the slipping wheel. While the first pressure $p_1$ is still constant, as shown graph (2), the velocity of the further driven wheel is increased relative to the velocity of the vehicle, as indicated in graph (3). At a first time $t_1$ the corresponding slip $\lambda_2$ of the further driven wheel exceeds a slipping trend threshold $thr_1$ which is below the slipping threshold $thr_2$ on the same scale. Hence, the slip $\lambda_2$ of the further driven wheel is not considered as a wheel slip which is to be regulated by the anti-spin regulation system, but is considered as a trend of the further driven wheel to start slipping.

Resulting thereof, a second pressure $p_2$ is built up in steps in a second branch of the hydraulic brake system in order to apply braking force to the further driven wheel. The second pressure $p_2$ is built up in steps, i.e. pressure building pulses are alternating with pausing times.

The second pressure $p_2$ is built up as long as the slip $\lambda_2$ is above the slipping trend threshold $thr_1$. However, in order to remain within a desired range the extent of the pressure building pulses is decreased over the time, whereas the pausing times are increased. The pressure building procedure is terminated as soon as the slip $\lambda_2$ of the further driven wheel is below the slapping trend threshold $thr_1$ again at a second time $t_2$. Moreover, the pressure within the second branch of the hydraulic braking system is reduced in steps in the following time.

Starting at the first time $t_1$, when the slip $\lambda_2$ of the further driven wheel exceeds the slipping trend threshold $thr_1$, the first pressure $p_1$ which is applied to a first branch within the hydraulic braking system and therefore to the slipping wheel, is reduced over the time. For simplicity, a continues reduction is depicted. However, any other suitable function hereof may be used.

Then, at the second time $t_2$, when the slip $\lambda_2$ of the further driven wheel is below the slipping trend threshold that again, the first pressure $p_1$ is increased again, since the slip $\lambda_1$ of the slipping wheel is still above the slipping threshold $thr_2$. However, it is also possible, to maintain or to further decrease the first pressure $p_1$, depending on the conditions occurring.

Figure 2:
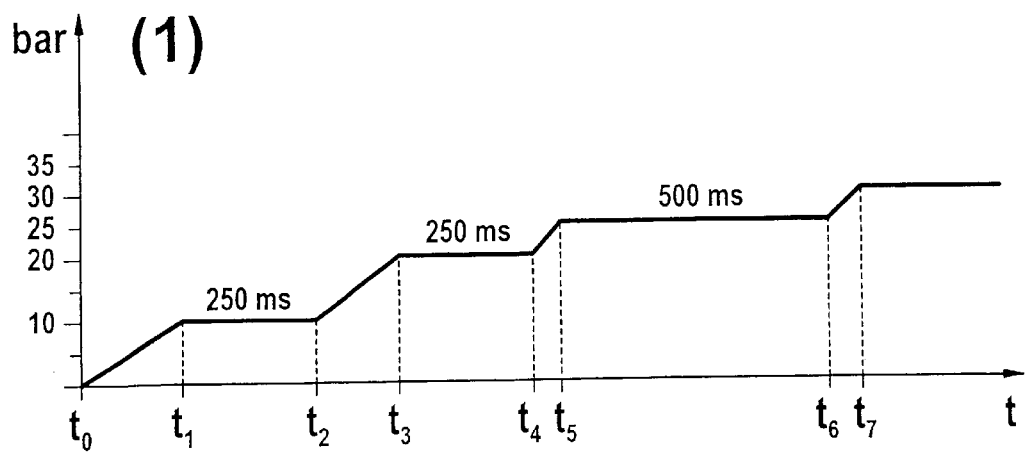
FIG. 2 shows a depiction of graphs of further details of the example of FIG. 1.
Figure 2:
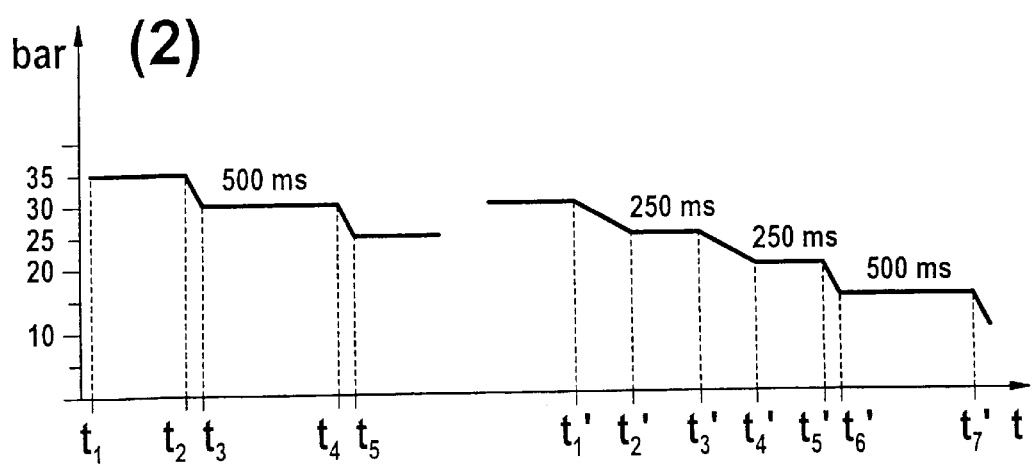

Within FIG. 2 there are two graphs depicting in greater detail how the second pressure $p_2$ is built up and reduced again in case of an exemplary embodiment of an exemplary rear wheel drive.

In more detail, in, graph (1) the second pressure $p_2$ is built up in steps starting with a low pressure of about 0 bar at a starting time $t_0$. Beginning with the starting time $t_0$ the pressure $p_2$ is increased up to 10 bar at a first time $t_1$. Then, the pressure is held constant for 250 ms until a second time $t_2$. Between the second time $t_2$ and a third time $t_3$ the pressure $p_2$ is further increased up to 20 bar where it is held constant for another 250 ms until a fourth time $t_4$. Between the fourth time $t_4$ and a fifth time $t_5$ the pressure $p_2$ is further increased up to 25 bar, which means, this step is just half as large as the two foregoing steps from 0 to 10 bar and from 10 bar to 20 bar. Then, the pressure $p_2$ is held constant for 500 ms until a sixth time $t_6$. Hence, the pressure holding time between the fifth time $t_5$ and the sixth time $t_6$ is twice is large as between the first time $t_1$ and the second time $t_2$ or between the third time $t_3$ and the fourth time $t_4$. Finally, between the sixth time $t_6$ and a seventh time $t_7$ the pressure $p_2$ is further increased up to 30 bar.

Within graph (2), two profiles are shown, how the pressure $p_2$ might be decreased-again:

Firstly, assuming the pressure $p_2$ was built up to about 35 bar at a first time $t_1$, it is now reduced down to about 30 bar between a second time $t_2$ and a third time $t_3$. Then, it is held constant between the third time $t_3$ and a fourth time $t_4$ for 500 ms. Furthermore, between the fourth time $t_4$ and a fifth timer $t_5$ it is further reduced down to about 25 bar, and so on. Within this example, the gradient of the reduction of the pressure $p_2$ (corresponding to the steps of 5 bar and the relatively long pressure holding times of 500 ms) is relatively low throughout the whole procedure.

Secondly, between a first time $t_1'$ and a second time $t_2'$ the pressure $p_2$ is decreased from about 30 bar down to about 25 bar. Then, it is held constant between the second time $t_2'$ and a third time $t_3'$ for 250 ms. Between the third time $t_3'$ and a fourth time $t_4'$ the pressure $p_2$ is further decreased down to about 20 bar. Again, it is held constant for 250 ms between the fourth time $t_4'$ and a fifth time $t_5'$, before it is further decreased down to about 15 bar between the fifth time $t_5'$ and a sixth time $t_6'$. Between the sixth time $t_6'$ and a seventh time $t_7'$ the pressure $p_2$ is held constant for 500 ms, and so on. Hence, the reduction of pressure $p_2$ starts with a relatively high gradient corresponding to the steps of 5 bar and the relatively short pressure holding times of 250 ms and continues with a relatively low gradient corresponding to the steps of 5 bar and the relatively long pressure holding times of 500 ms once the pressure $p_2$ is below 20 bar.

Finally, as mentioned above, in FIG. 3 an exemplary environment is described, in which the invention is implemented. In more detail, FIG. 3 shows a hydraulic system which is eligible for use with the inventive method and implemented as a first brake circuit 10 of a hydraulic braking system within a car. By way of example, the first brake circuit 10 is used for braking the right rear wheel 20 and the left rear wheel 30 of a car which has a rear wheel drive (hence, there is a second brake circuit for the remaining two wheels required which, for simplicity, is not shown in FIG. 3). A corresponding hydraulic brake system is referred to as "TT-brake circuit partition". However, it is to be understood, that any other hydraulic brake system (as well as any other wheel drive such as an all-wheel drive or a front wheel drive and any other hydraulic system in general) may be used with the inventive method. This in particular holds for a so-called "X-brake circuit partition", in which a separate brake circuit is used for one rear wheel and one front wheel, in a car which for example has an all-wheel drive. Moreover, the inventive method also may be used within a "X-brake circuit partition" in a car which has a rear or a front wheel drive.

The first brake circuit 10 has two independent pressure sources. Firstly, the car driver can produce pressure by pushing a brake pedal 40 which is connected to a main brake cylinder 50 with a pressurized medium reservoir 60. Secondly, there is a high pressure pump 70, which is driven by an electrical driving motor 80 and which is controlled by a control unit 90. Hence, the first brake circuit 10 is eligible for a simple pedal driven braking procedure as well as for use as a anti-lock braking system (ABS) or as an anti-spin regulation (ASR) system both of which require the implementation of the motor driven pressure pump 70 in order to built up pressures independently of what any car driver is doing.

In more detail, anti-lock braking (ABS) is performed in principle by means of detecting wheel speeds during a braking procedure and frequently opening and closing individual wheel brakes 220, 230 in case a wheel speed is reduced to zero but the total speed of the car is not. On the other hand, anti-spin regulation (ASR) is performed in principle by means of detecting wheel speeds during a starting or driving procedure and frequently closing and opening individual wheel brakes 220, 230 in case the speed of a driven wheel exceeds the speed of other wheels and/or the total speed of the car. Hence, there are wheel speed sensors 25, 35 implemented, which are eligible to detect the speed of each individual wheel 20, 30.

Furthermore, as according to the invention, the wheel speed sensors 25 or 35 are used to monitor each non-braked wheel 20 or 30 during an anti-spin regulation of the remaining other wheel 30 or 20. The monitoring results are provided to the control unit 90 and used to determine whether the non-braked wheel tends to slip or not during the anti-spin regulation of the remaining other wheel by the control unit 90. Moreover, the control unit 90 is eligible to control the hydraulic braking system as according to the invention due to a corresponding soft- and/or hardware implementation.

Moreover, the first brake circuit 10 is branched and comprises within its branches six 2/2 port directional control valves 100, 110, 120, 130, 140 and 150 (shortly: 2/2 valves 100, 110, 120, 130, 140 and 150). Each of these 2/2 valves 100, 110, 120, 130, 140, 150 can be switched between a bidirectional (or one-directional in case of 2/2 valves 130 and 140) flow-through position FTP and a locking position LP. Thereby, each switch is implemented by means of a spring-actuated first position (i.e. either the flow-through position FTP or the locking position LP) and an electromagnetically-actuated second position (i.e. either the locking position LP or the flow-through position FTP), as indicated in FIG. 3. Hence, each switch (and therefore each 2/2 valve 100, 110, 120, 130, 140, 150) is controlled by means of charging or discharging a corresponding electromagnetic magnet and said charging or discharging procedures are controlled by the control unit 90. As a result, the first brake circuit 10 can be modified by the control unit 90 by means of opening and closing any of the 2/2 valves 100, 110, 120, 130, 140, and/or 150 and therefore opening and closing the individual branches of the first brake circuit 10. Hence, the first brake circuit can be set into several configurations which are required to perform simple pedal driven braking, ABS braking and/or ASR procedures.

Within FIG. 3, the first brake circuit is shown in a configuration eligible for simple pedal driven braking. In this configuration, pushing the pedal 40 results in a pressure production within the main brake cylinder 50. The pressure is transported within a pressurized medium along a root line 160, a first branch 170 (through the first 2/2 valve 100, in the following referred to as shut-off valve 100, which is in its flow-through position FTP) and a third and a fourth branch 190, 200 (through the second respectively third 2/2 valves 110 resp. 120, in the following referred to as first resp. second inlet 2/2 valves 110, 120, which are in their flow-through positions FTP). From this, a first and a second wheel brake 220, 230 are activated.

Within this constellation, switching on the high pressure pump 70 by means of the electrical driving motor 80 (and controlled by the control unit 90) would basically have no effect on the braking system. This is because the 2/2 valve 150 within the second branch 180 is in its locking position LP. Hence, there is no pressurized medium supplied into the inlet 71 of the high pressure pump 70 which otherwise would be available out of the pressurized medium reservoir 60 through the second branch 180.

On the other hand, by means of switching the 2/2 valve 150 into its flow-through position FTP and switching the shut-off 2/2 valve 100 into its locking position LP the high pressure pump 70 instead of the brake pedal 40 might produce pressure on the wheel brakes 220, 230. Thereby, the maximum pressure is limited by means of a pressure control valve 210 which is adjusted to any desired maximum pressure and which would open an overflow line 240 in case a corresponding threshold is exceeded.

As a result, by means of opening and closing the 2/2 valves in an eligible manner any anti-spin regulation (ASR) can be performed by the system as according to the state of the art. While doing so, the wheel speed sensors 25 or 35 can be used to monitor each non-braked wheel. The control unit 90 can be used to determine whether the non-braked wheel tends 20 or 30 to slip or not while using the monitoring results. Then, whenever a slipping trend occurs, the control unit 90 can cause the system to brake the non-braked wheel 20 or 30 as described above.

It has to be understood, that any other eligible braking system can be used with the invention. Moreover, instead of the control unit 90 other components may be used in order to determine whether the non-braked wheel tends 20 or 30 to slip or not while using the monitoring results. Furthermore, additional wheel speed sensors may be used in order to detect slipping trends (for example, the additional wheel speed sensors might be more sensitive than the ordinary available wheel speed sensors 25 and 35).

What is claimed is:

1. Method for an anti-spin regulation (ASR) for a vehicle, characterized in that
    a slipping driven wheel (20, 30) is braked by braking means (220, 230);
    a further driven wheel (20, 30) is monitored by monitoring means (25, 35); and
    the further driven wheel (20, 30) is braked by the braking means (220, 230) in case a slipping trend is determined by determination means (90) from the monitoring results for said further driven wheel (20, 30); and
    characterized in that the slipping trend is determined by the determination means (90) for said further driven wheel (20, 30) by means of
        a) comparison of the velocity ($v_w$) of one of the slipping driven wheel and the further driven wheel (20, 30) to the velocity ($v_v$) of the vehicle; and
        b) comparison of the difference of the velocity of the one of the slipping driven wheel and the further driven wheel and the velocity of the vehicle to a predefined slipping trend threshold ($thr_1$).

2. Method as according to claim 1, characterzied in that the braking force on the slipping driven wheel (20, 30) is reduced when the slipping trend is determined by the determination means (90) for said further driven wheel (20, 30).

3. Method as according to claim 1, characterized in that the braking force on the further driven wheel (20, 30) is built up in steps as long as a slipping trend threshold ($thr_1$) is exceeded.

4. Method as according to claim 1, characterized in that the gradient for building up the braking force on the further driven wheel (20, 30) is modified in accordance with the achieved braking force.

5. Method as according to claim 1, characterized in that the braking force on the further driven wheel (20, 30) is reduced in steps when the slipping trend value is below a slipping trend threshold.

6. Method for an anti-spin regulation (ASR) for a vehicle, characterized in that
    a slipping driven wheel (20, 30) is braked by braking means (220, 230);
    a further driven wheel (20, 30) is monitored by monitoring means (25, 35); and
    the further driven wheel (20, 30) is braked by the braking means (220, 230) in case a slipping trend is determined by determination means (90) from the monitoring results for said further driven wheel (20, 30); and
    characterized in that
        a) the anti-spin regulation is executed, when a slipping threshold ($thr_2$) is exceeded by the difference of the velocity ($v_w$) of the slipping wheel (20, 30) and the velocity ($v_v$) of the vehicle; and
        b) a slipping trend threshold ($thr_1$) is on the same scale below the slipping threshold ($thr_2$).

7. Method as according to claim 6, characterized in that the braking force on the slipping driven wheel (20, 30) is reduced when the slipping trend is determined by the determination means (90) for said further driven wheel (20, 30).

8. Method as according to claim 6, characterized in that the braking force on the further driven wheel (20, 30) is built up in steps as long as a slipping trend threshold ($thr_1$) is exceeded.

9. Method as according to claim 6, characterized in that the gradient for building up the braking force on the further driven wheel (20, 30) is modified in accordance with the achieved braking force.

10. Method as according to claim 6, characterized in that the braking force on the further driven wheel (20, 30) is reduced in steps when the slipping trend value is below a slipping trend threshold.

11. A method for anti-spin regulation of a vehicle, comprising the steps of:
    braking a slipping driven wheel;
    monitoring a further driven wheel;
    determining a slipping trend in accordance with monitoring results for the further driven wheel obtained in the monitoring step; and
    braking the further driven wheel in accordance with the slipping trend determined in the determining step, wherein the determining step includes the substeps of:
        comparing a velocity of one of the slipping driven wheel and the further driven wheel to a velocity of the vehicle; and
        comparing a difference of the velocity of the one of the slipping driven wheel and the further driven wheel and the velocity of the vehicle to a predefined slipping trend threshold.

12. The method according to claim 11, further comprising the step of:
    executing an anti-spin regulation when a slipping threshold is exceeded by the difference of the velocity of the one of the slipping driven wheel and the further driven wheel and the velocity of the vehicle and the slipping trend threshold is on a same scale below the slipping threshold.

13. The method according to claim 12, further comprising the step of building up a braking force on the further driven wheel in steps as long as the slipping trend threshold is exceeded.

14. The method according to claim 13, further comprising the step of modifying a gradient for building up the braking force on the further driven wheel in accordance with an achieved braking force.

15. The method according to claim 11, further comprising the step of reducing a braking force on the slipping driven wheel in accordance with the slipping trend for the further driven wheel determined in the determining step.

16. The method according to claim 15, wherein the braking force on the further driven wheel is reduced in the reducing step in steps when a slipping trend value is below a slipping trend threshold.

17. A method for anti-spin regulation of a vehicle, comprising the steps of:
    braking a slipping driven wheel;
    monitoring a further driven wheel;

determining a slipping trend in accordance with monitoring results for the further driven wheel obtained in the monitoring step; and braking the further driven wheel in accordance with the slipping trend determined in the determining step;

wherein the determining step includes the substeps of:
comparing a velocity of one of the slipping driven wheel and the further driven wheel to a reference velocity; and comparing a difference of the velocity of the one of the slipping driven wheel and the further driven wheel and the reference velocity to a predefined slipping trend threshold.

18. The method according to claim 17, further comprising the step of:

executing an anti-spin regulation when a slipping threshold is exceeded by the difference of the velocity of the one of the slipping driven wheel and the further driven wheel and the reference velocity and the slipping trend threshold is on a same scale below the slipping threshold.

19. The method according to claim 18, further comprising the step of building up a braking force on the further driven wheel in steps as long as the slipping trend threshold is exceeded.

20. The method according to claim 19, further comprising the step of modifying a gradient for building up the braking force on the further driven wheel in accordance with an achieved braking force.

* * * * *

UNITED STATES PATENT AND TRADEMARK OFFICE
CERTIFICATE OF CORRECTION

PATENT NO.    : 6,709,074 B2
DATED         : March 23, 2004
INVENTOR(S)   : Wandel, Helmut It is certified that error appears in the above-identified patent and that said Letters Patent is hereby corrected as shown below:

<u>Column 4,</u>
Line 27, change "For simplicity, a continues" to -- For simplicity, a continous --
Line 31, change "threshold that again" to -- threshold $thr_1$ again --
Line 60, chage "might be decreased-again;" to -- might be decreased again; --

Signed and Sealed this

Thirty-first Day of May, 2005

JON W. DUDAS
*Director of the United States Patent and Trademark Office*